(12) United States Patent
Koizumi (10) Patent No.: US 7,556,065 B2
(45) Date of Patent: Jul. 7, 2009

(54) METAL BELLOWS TUBE, METHOD OF PRODUCING THE SAME, AND FLEXIBLE TUBE FOR HIGH-PRESSURE FLUID

(75) Inventor: Kazuo Koizumi, Kobe (JP)

(73) Assignee: Ork Corporation, Osaka (JP)

( * ) Notice: Subject to any disclaimer, the term of this patent is extended or adjusted under 35 U.S.C. 154(b) by 696 days.

(21) Appl. No.: 10/526,496

(22) PCT Filed: Sep. 4, 2003

(86) PCT No.: PCT/JP03/11282

§ 371 (c)(1),
(2), (4) Date: Mar. 4, 2005

(87) PCT Pub. No.: WO2004/023017

PCT Pub. Date: Mar. 18, 2004

(65) Prior Publication Data

US 2006/0151041 A1    Jul. 13, 2006

(30) Foreign Application Priority Data

Sep. 6, 2002  (JP) ............................. 2002-262072
Apr. 17, 2003  (JP) ............................. 2003-113508

(51) Int. Cl.
*F16L 11/00* (2006.01)

(52) U.S. Cl. ................. 138/121; 138/109; 138/127; 138/173; 285/222.5

(58) Field of Classification Search ............ 138/121, 138/122, 131, 109, 142, 173; 285/222.5, 285/288.1, 288.2, 288.4; 29/897.2
See application file for complete search history.

(56) References Cited

U.S. PATENT DOCUMENTS

| | | | | | |
|---|---|---|---|---|---|
| 401,706 | A | * | 4/1889 | Legat | 285/114 |
| 461,997 | A | * | 10/1891 | Choen | 138/121 |
| 2,836,200 | A | * | 5/1958 | Webbe | 285/115 |
| 3,326,091 | A | | 6/1967 | Allen | 92/34 |
| 3,336,950 | A | * | 8/1967 | Fochler | 138/121 |
| 3,420,553 | A | * | 1/1969 | Poxon et al. | 285/49 |
| 3,468,560 | A | | 9/1969 | Cassel | 285/21.1 |
| 3,577,621 | A | * | 5/1971 | De Gain | 29/897.2 |
| 3,605,232 | A | * | 9/1971 | Hines | 29/890.144 |
| 3,699,624 | A | * | 10/1972 | De Gain | 29/897.2 |
| 3,847,184 | A | | 11/1974 | God | 138/120 |
| 4,089,351 | A | * | 5/1978 | Ward et al. | 138/109 |
| 5,560,396 | A | * | 10/1996 | Kramer, Jr. | 138/109 |

(Continued)

FOREIGN PATENT DOCUMENTS

CN    2384085 Y    6/2000

(Continued)

*Primary Examiner*—Patrick F Brinson
(74) *Attorney, Agent, or Firm*—Wenderoth, Lind & Ponack, L.L.P.

(57) ABSTRACT

A metal bellow tube has sectional shapes of a ridge and a valley in a bellows-shaped tube wall of a metal bellows tube that are made to be V-shaped. As a result, a metal bellows tube with significantly improved bending fatigue resistance compared to conventional ones is provided. In addition, by this metal bellows tube and a tubular metal braid covering the outside of the tube, a flexible tube for a high-pressure fluid can be constituted. Consequently, a high-pressure fluid exceeding 20 MPa, particularly even a superhigh-pressure fluid of 70 MPa, can be transferred safely without transmitting the molecules of the fluid.

9 Claims, 8 Drawing Sheets

U.S. PATENT DOCUMENTS

| | | | | |
|---|---|---|---|---|
| 6,216,742 | B1 * | 4/2001 | Masui et al. | 138/121 |
| 6,354,332 | B1 * | 3/2002 | Burkhardt et al. | 138/109 |
| 2004/0007278 | A1 * | 1/2004 | Williams | 138/121 |

FOREIGN PATENT DOCUMENTS

| | | |
|---|---|---|
| DE | 12 14 062 | 4/1966 |
| DE | 38 08 383 | 9/1989 |
| DE | 200 22 457 | 10/2001 |
| EP | 1 174 653 | 1/2002 |
| FR | 2 759 141 | 8/1998 |
| GB | 1 100 114 | 1/1968 |
| GB | 2 298 016 | 8/1996 |
| JP | 63-186091 | 8/1988 |
| JP | 63-231085 | 9/1988 |
| JP | 9-14528 | 1/1997 |
| JP | 11-190469 | 7/1999 |
| JP | 2001-295963 | 10/2001 |

* cited by examiner

FIG. 10

METAL BELLOWS TUBE, METHOD OF PRODUCING THE SAME, AND FLEXIBLE TUBE FOR HIGH-PRESSURE FLUID

This application is U.S. national stage of International Application No. PCT/JP2003/011282, filed Sep. 4, 2003.

TECHNICAL FIELD

The present invention relates to a metal bellows tube, a method of producing the same, and a flexible tube for high-pressure fluid using said bellows tube. Said flexible tube for high-pressure fluid is used to supply or transfer a high-pressure fluid, such as high-pressure hydrogen gas and the like, used for a hydrogen fuel cell.

BACKGROUND ART

Since metal bellows tubes are metal tubes with a bellows-shaped tube wall and permit expansion/contraction, deflection and bending, they are used for the purpose of absorbing displacements such as of thermal expansion/contraction, vibration, quake resistance, quake absorption, land subsidence and the like in, for example, movable piping of industrial equipment and apparatuses; plant piping in steel, petroleum refining, petrochemistry, power generation and other key industries, and the like.

A metal bellows tube (hereinafter also simply referred to as "bellows tube") has conventionally been produced by superposing a plurality of discs, pressed into a specified sectional shape, and welding the inner peripheries and outer peripheries of mutually adjacent discs. However, because this method involves a large number of manufacturing steps and is not suitable for mass production, the metal bellows tube obtained is expensive, and, when a stress is applied onto the weld, rupture and cracking are likely to occur at the portion and the durability is not satisfactory. Thus, methods of producing a bellows tube from a metal tube (fundamental tube) have been developed. As examples of such methods, the hydraulic forming method, the elastomer forming method, the continuous die forming method and the like can be mentioned.

The hydraulic forming method is a method wherein circular molds are arranged at a constant gap in the outer periphery of a metal tube, and a liquid is filled in the tube in this state and the tube wall of the metal tube is pressurized to form it into a bellows form. In addition, the elastomer forming method is a method comprising inserting an elastic member (elastomer) into a predetermined part in a metal tube with the metal tube set between a forming die and a core metal, pressurizing the elastic member from both ends thereof (both ends in the longitudinal direction of the tube) to swell the predetermined site of the metal tube by the pressurized deformation force of the elastic member, and then pressure-forming the swollen portion in the forming die. This method (i.e. work) is repeatedly conducted while moving the forming part in the longitudinal direction of the metal tube to form a bellows. The continuous die forming method is a method wherein a metal tube is passed through a corrugation forming die fit to a die holder via a bearing inserted therebetween, to support the center of the tube and the center of the die eccentrically. The projection of the die is intruded into the metal tube, while rotating the corrugation forming die around the center of the tube, to continuously form a circumferential groove, forming the tube wall in a bellows form. Details of these methods are described in "Sosei To Kakou" (Journal of the Japan Society for Technology of Plasticity), Vol. 32, No. 366 (1991-7), pp. 818-823.

The use of metal bellows tubes has been further expanding in recent years, and accordingly there is expectation of further improvement of the flexibility of the metal bellows tube, particularly of further improvement of the durability in repeated bending deformation (that is, bending fatigue resistance). However, a technology that enables sufficient improvement of the bending fatigue resistance of the metal bellows tube has not yet been fully established.

On the other hand, as a future important use of the metal bellows tubes, there is a use wherein a high-pressure fluid such as the hydrogen fuel cell must be transported.

The hydrogen fuel cell is an apparatus wherein hydrogen gas supplied as a fuel from outside and oxygen (normally that in the atmosphere) are electrochemically reacted in said cell to generate electricity. Because only heat and steam are produced as by-products from the electrochemical reaction in said cell, the hydrogen fuel cell is drawing attention as a clean energy source that does not contaminate the global environment.

In particular, means of transportation such as passenger cars and buses equipped with the hydrogen fuel cell as a power source for driving force (what is called fuel cell vehicles) are important as next-generation means of transportation, and various technologies for their practical application have been developed (see, for example, Publication of Unexamined Japanese Patent Application No. 2003-086213).

For bringing fuel cell vehicles into practical application in society, there is a need for, in addition to technology for the hydrogen fuel cell itself mounted on the vehicle, equipment for supplying hydrogen gas to fuel cell vehicles, like gasoline stations. Such hydrogen gas supply equipment, under the alias of "hydrogen gas supply station", "hydrogen station" and the like, is under investigation for practical applications.

The present inventor has investigated the above-described hydrogen gas supply equipment and found that the flexible hose for supplying hydrogen gas from a storage tank fixed to the supply equipment to the fuel cell vehicle has not yet been investigated fully and involves a problem. The problem arises from the fact that the hydrogen gas to be supplied is high pressure gas not found conventionally.

Conventionally, there were some cases wherein compressed natural gas was used as a fuel gas for vehicles, in which cases the gas pressure was about 20 MPa (200 atm).

In contrast, the hydrogen gas used for the hydrogen fuel cell is of higher pressures such as 25 MPa (about 250 atm) and 35 MPa (about 350 atm), and supply thereof at a superhigh pressure of 70 MPa (about 700 atm) is being considered for the future.

To supply hydrogen at such high pressure from a fixed gas tank to vehicles of various sizes (in addition, there is variation in vehicle stop position), a flexible tube, as a mediator, is necessary.

Flexible tubes conventionally used for supplying a high-pressure gas of about 20 MPa or so, are resin tubes reinforced by containing a metal wire and a metal bellows tube wherein elongation is limited by covering the tube with a metal braid.

However, for supplying high-pressure hydrogen gas used in hydrogen fuel cells, the above-described resin tube is undesirable because the hydrogen gas passes through the tube wall. Also, the above-described metal bellows tube cannot supply a superhigh-pressure gas, as high as 70 MPa, due to repeated expansion/contraction from gas filling and release. Repeated action of stress in the circumferential direction of the tube body, bending fatigue from repeated bending deformation of the tube, and the like, metal fatigue can occur in the bellows portion and the tube may break. Also, no improvement has been made in the coating of the metal braid, thus the tube may break.

These problems are problems that arise likewise, not only in the case of high-pressure hydrogen gas supply in the hydrogen fuel cell, but also in the supply of other superhigh-pressure fluids.

SUMMARY OF THE INVENTION

Accordingly, a first object of the present invention is to provide a metal bellows tube with sufficiently improved bending fatigue resistance compared to conventional products and a method of producing the same.

Also, a second object of the present invention is to provide a flexible tube that can be safely used for the transfer of a high-pressure fluid exceeding 20 MPa, particularly even a superhigh-pressure fluid of 70 MPa, without transmitting the molecules of the fluid.

The present invention, as a result of extensive investigation with the aim of accomplishing the above-described objects, has determined that in improving the bending fatigue resistance of a metal bellows tube, it is effective to decrease the pitch of the bellows in the bellows-shaped tube wall. Based on further investigations conducted from this finding, the metal bellows tube of the present invention has developed and a method of producing the same.

Furthermore, by using the metal bellows tube according to the present invention, and increasing the strength of a braid for suppressing the elongation of said metal bellows tube, a flexible tube is configured that enables the safe transfer, without transmission, even of a superhigh-pressure fluid as described above.

That is, the present invention has the following characteristics.

(1) A metal bellows tube wherein sectional shapes of a ridge and a valley in a bellows-shaped tube wall are V-shaped.

(2) The metal bellows tube of (1) above, wherein the pitch of the bellows is 1.5 mm or less, and the height of the ridge is 0.5-4.0 mm.

(3) The metal bellows tube of (2) above, wherein the thickness of the wall of the bellows-shaped tube is 0.1-0.3 mm.

(4) The metal bellows tube of any of (1)-(3) above, wherein the tube has an outside diameter of 4.5-20 mm.

(5) A method of producing a metal bellows tube, which comprises preparing a metal bellows fundamental tube wherein sectional shapes of a ridge and a valley in a bellows-shaped tube wall are U-shaped, compressing the fundamental tube in the longitudinal direction to bring adjacent ridges and valleys of the bellows-shaped tube wall into close contact with each other, further pressure-forming the tube until the inside space of each ridge and the gap between adjacent ridges substantially disappear by pressing, and then stretching, in the longitudinal direction of the tube, the fundamental tube after the pressure forming until a peak-to-peak gap of the adjacent ridges reaches a predetermined distance.

(6) The production method of (5) above, wherein the peak-to-peak gap between adjacent ridges is 1.5 mm or less, and the height of the ridge is 0.5-4.0 mm, after stretching, in the longitudinal direction of the tube, of the above fundamental tube after the pressure forming.

(7) A flexible tube for a high-pressure fluid, which is capable of transferring a high-pressure fluid of 70 MPa, and which comprises a metal bellows tube and a tubular metal braid covering the outside of said tube, wherein the metal bellows tube has been formed such that a ridge and a valley in the bellows-shaped tube wall have a V-shaped sectional shape, the tubular metal braid has both ends joined with the respectively corresponding both ends of the metal bellows tube, and the total sectional area S of the metal braid member and the material of the metal strand are determined so as to satisfy $$(\sigma \times \cos(\theta/2))/n \geq F/S$$

wherein F [N] is a force of a high-pressure fluid which acts to stretch a metal bellows tube, S [mm$^2$] is the total sectional area of a metal strand appearing on the cross-section of the metal braid, a crossing angle θ of the metal braid=50-120 degrees, σ [MPa] is a tensile strength of the material of said metal strand, and n is a safety factor.

(8) The flexible tube of (7) above, wherein the force F is 1374-17813 [N] and the safety factor n is 4.

(9) The flexible tube of (7) above, wherein the high-pressure fluid is a hydrogen gas or a mixture of a hydrogen gas and liquid hydrogen.

(10) The flexible tube of (7) above, wherein the both ends of the metal bellows tube have a metal pipe as a mouth piece, and the mouth piece is joined with the end of the metal braid by welding or brazing.

(11) The flexible tube of (7) above, wherein the end of the metal braid is joined with a mouth piece by brazing, the end of the metal braid is furnished with a braid presser ring covering the braid, the metal braid and the braid presser ring are brazed to the mouth piece, with the end faces approximately at an even position, the braid presser ring has a through hole that exposes the metal braid at a predetermined position from the end face, and the through hole allows confirmation of penetration of a solder in the braid at least to the predetermined position.

(12) The flexible tube of (7) above, wherein the end of the metal braid is joined with a mouth piece by brazing, the end of the metal braid is furnished with a braid presser ring covering the braid, the metal braid and the braid presser ring are brazed to the mouth piece, with the end faces approximately at an even position, and the inside of the braid presser ring and/or the outside of the mouth piece comprises a circular recess or single recess that allows a solder to flow therein and serves as a stopper.

(13) The flexible tube of (7) above, wherein the metal bellows tube has a pitch of the bellows of 2 mm or less, and a height of the ridge of 1-4 mm.

(14) The flexible tube of (7) above, wherein the thickness of the wall of the bellows-shaped tube is 0.1-0.5 mm.

(15) The flexible tube of (7) above, wherein the metal bellows tube has an inside diameter of 4-17 mm.

(16) The flexible tube of (7) above, wherein the metal bellows tube is formed by the production method of (5) above.

(17) The flexible tube of (7) above, wherein the above-described force F is 1374-17813 [N] and n=4, the metal bellows tube is made of stainless steel, and has an inside diameter of 4-17 mm and a thickness of the wall of the bellows-shaped tube of 0.1-0.5 mm, and the metal braid has a structure wherein a densely braided layer comprising strands made of stainless steel and having a diameter of 0.3 mm in strand number of 6-10 is superposed in 2 to 6 layers on the outside of the metal bellows tube.

DETAILED DESCRIPTION OF THE INVENTION

The present invention is hereinafter described in more detail.

Figure 1:
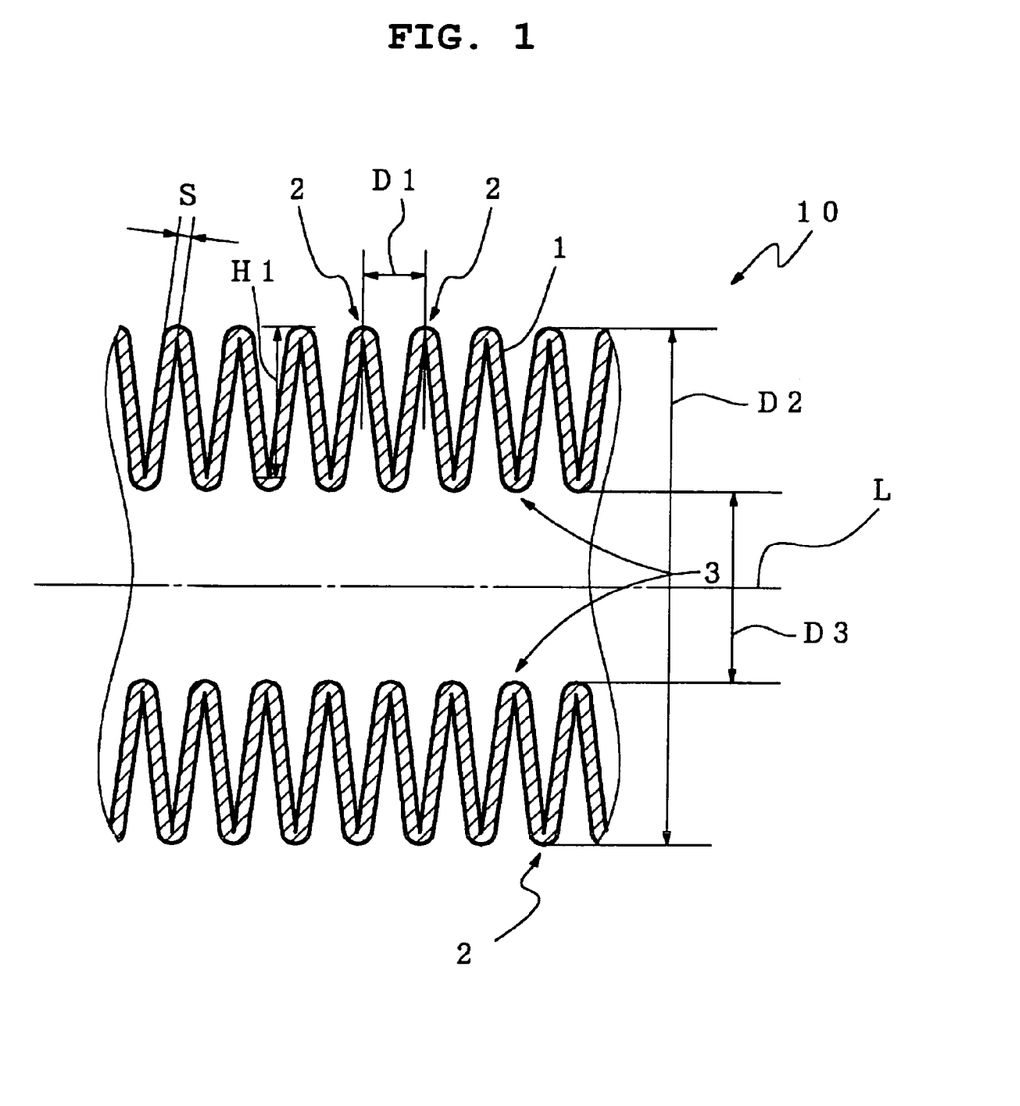
FIG. 1 is a partial frontal sectional view showing an example of the metal bellows tube of the present invention.

FIG. 1 is a partial frontal sectional view of an example of the metal bellows tube of the present invention; the metal bellows tube of the present invention is mainly characterized in that, as with the metal bellows tube 10 of the example, the sectional shapes of the ridge 2 and valley 3 in the bellows-shaped tube wall 1 are V-shaped. Note that, the external shape of the tube is normally cylindrical.

Here, "ridge" is a portion extending outwardly from the tube in the bellows-shaped tube wall 1, and "valley" is a portion extending inwardly from the tube in the bellows-shaped tube wall 1. Also, "the sectional shapes of the ridge and valley" means the shapes of the sections obtained by cutting the "ridge" and "valley" on a plane including the axial line L of the tube, and "the sectional shapes of the ridge and valley are V-shaped" mean that, as shown in FIG. 1, the respective edge lines (cutting-plane lines) of the face inside the ridge 2 and the face outside the valley 3 appearing on the aforementioned section are folded in a V-shape state. Note that the peak of the folded edge (cutting-plane line) may form a curve having a curvature radius of 0.4 mm or less.

As such, the metal bellows tube of the present invention, wherein the sectional shapes of the ridge and valley in the bellows-shaped tube wall are V-shaped, is embodied by the production method of the present invention described below, and cannot be produced by the hydraulic forming method, the elastomer forming method, or the continuous die forming method described, which are described in the aforementioned Background Art. Note that the sectional shapes of the "ridge" and "valley" of the bellows-shaped tube wall formed by the conventional production method for a metal bellows tubes are "U-shaped". Said "U-shaped" refers to that the face inside the tube of the "ridge" and the face outside the tube of the "valley" are curved (in the state of FIG. 3).

The metal bellows tube of the present invention, because the sectional shapes of the ridge 2 and valley 3 in the bellows-shaped tube wall 1 are V-shaped, permits easy bending deformation and makes it possible to decrease the pitch of the bellows in the bellows-shaped tube wall 1.

Here, the "pitch of the bellows" is the peak-to-peak gap D1 of two adjacent ridges 3 in FIG. 1; said "pitch of the bellows (gap D1)" is substantially constant in the portion contributing to at least repeated bending motion in the longitudinal direction of the bellows tube 10, and normally substantially constant in the entire longitudinal direction of the entire tube. Note that "substantially constant" means that the pitch has not been changed intentionally, and pitch variation that occurs due to manufacturing tolerance is acceptable.

The bellows tube of the present invention, because the sectional shapes of the ridge and valley in the bellows-shaped tube wall 1 are V-shaped, makes it possible to decrease the pitch compared to conventional products, without excessively decreasing the thickness of the bellows-shaped tube wall 1. For example, when the thickness of the bellows-shaped tube wall 1 is 0.2 mm, the pitch D1 can be 1.5 mm or less, preferably 1.0 mm or less, more preferably 0.8 mm or less. Thereby, in addition to that the ridge and valley are V-shaped, the pitch of the bellows is sufficiently small, so that high flexibility is possessed and a sufficient thickness of the tube wall is assured; therefore, bending fatigue resistance improves extremely. However, if the pitch D1 is too small, adjacent ridges (valleys) interfere with each other so that flexibility decreases; therefore, in the present invention, the lower limit of the pitch D1 is preferably 0.3 mm or more, more preferably 0.4 mm or more.

Note that in a bellows-shaped tube produced by a conventional production method, wherein the sectional shapes of the ridge and valley in the bellows-shaped tube wall are U-shaped, the pitch of the bellows, even at the least, exceeds 1.5 mm.

Also, in the metal bellows tube used for a flexible tube for a high-pressure fluid, for example, when the thickness of the tube wall is 0.3 mm, the pitch D1 can be 1.6 mm or less, preferably 1.4 mm or less, more preferably 1.2 mm or less. Thereby, in addition to that the ridge and valley are V-shaped, the pitch of the bellows is sufficiently small so that high flexibility is possessed and a sufficient thickness of the tube wall is assured; therefore, bending fatigue resistance improves extremely. However, if the pitch D1 is too small, adjacent ridges (valleys) interfere with each other so that flexibility decreases; therefore, in the aforementioned case, the lower limit of the pitch D1 is preferably 1.0 mm or more.

The wall thickness of the bellows-shaped tube wall 1 (symbol S in FIG. 1) varies depending on the outside diameter, material and the like of the bellows tube, and is generally preferably 0.1-0.3 mm or so, more preferably 0.1-0.2 mm or so.

Also, when the flexible tube is used for high-pressure fluid, the wall thickness of the bellows-shaped tube wall varies depending on the inside diameter, outside diameter, material and the like of the metal bellows tube, and, considering the service pressure and manufacturing steps, is preferably 0.15-0.5 mm or so, more preferably 0.15-0.4 mm or so.

If the wall thickness of the bellows-shaped tube wall is less than the above-described range, production of the fundamental tube itself before bellows processing is difficult, making the bellows tube expensive and unable to withstand the above-described high pressure; on the other hand, if the wall thickness of the bellows-shaped tube wall is greater than the above-described range, the bellows tube becomes difficult to bend, which leads to a reduction in bending fatigue resistance.

In the bellows tube of the present invention, the pitch of the bellows in the bellows-shaped tube wall can be decreased as described above; when the state of such a bellows with a decreased pitch is expressed in terms of the number of ridges per unit length (1 cm) in the longitudinal direction of the tube, the number of ridges is 6-34 (preferably 10-25).

Also, in the metal bellows tube used for a flexible tube for a high-pressure fluid, when the pitch of the bellows is expressed in terms of the number of ridges per 10 cm in the longitudinal direction of the tube, the number of ridges is preferably 63-83, more preferably 71-83.

Also, in the bellows tube of the present invention, the height of the ridge 2 in the bellows-shaped tube wall 1 (symbol H1 in FIG. 1) is preferably 0.5-4.0 mm, more preferably 1.0-3.0 mm.

In the metal bellows tube used in a flexible tube for a high pressure fluid, the height $H_1$ of the ridge in the bellows-shaped tube wall is preferably 2.0-5.0 mm, more preferably 2.5-4.0 mm.

This is because, as the height of the ridge 2 increases, which is preferable from the viewpoint of the expansion/contraction of the bellows tube, the bellows tube becomes difficult to bend, which in turn leads to a reduction in the bending fatigue resistance, and also because, as the height of the ridge 2 decreases, the bellows tube becomes difficult to bend, which in turn leads to a reduction in the bending fatigue resistance.

Although the metal bellows tube of the present invention, like conventional ones, can be used for movable piping of industrial equipment and apparatuses, plant piping in steel, petroleum refining, petrochemistry, power generation and other key industries, and the like, and can also be used as an expansion/contraction tube (bellows) of a bellows-type expansion/contraction tube coupler, it can be particularly suitably used as a flexible tube. A flexible tube refers to a bellows tube having a relatively small outside diameter of the tube, used mainly for applications wherein the tube undergoes repeated bending motion while a fluid is being flown, and is used as, for example, a member for absorbing cumulative pressure and pulsation in oil hydraulic apparatuses of vehicle brake systems and various industrial hydraulic systems, a member for absorbing engine vibration, relative displacement of the engine and said piping system, and the like in automobile fuel systems, exhaust systems and coolant systems, a member for absorbing vibration and relative displacement in automobile air-conditioner coolant piping systems, and the like.

Although the outside diameter (distance D2 between the peaks of mutually facing ridges 2 shown in FIG. 1) of the bellows tube of the present invention is selected according to the specific use of the bellows tube, and is not subject to limitation, when the bellows tube is used as a flexible tube, the outside diameter is generally 4.5-20 mm, preferably 5-20 mm. Also, in this flexible tube, the difference between the outside diameter and inside diameter of the tube (distance D3 between the peaks of mutually facing valleys shown in FIG. 1) is preferably 2-6 mm.

Although the effective diameter of the metal bellows tube used for the flexible tube for a high pressure (the tube diameter which can be used for calculations when the tube inside pressure exerts the tensile force F in the longitudinal direction of the tube, that is, the diameter calculated as (D2+D3)/2 in FIG. 1) is not subject to limitation, it is preferably 12-16 mm, more preferably 13-16 mm.

The material that constitutes the bellows tube of the present invention is appropriately selected according to the fluid allowed to pass through the tube; stainless steel, plated iron, aluminum, brass and the like are usable, and using stainless steel is generally suitable from the viewpoint of corrosion resistance.

The metal bellows tube of the present invention can be produced by the method described below.

Figure 2:
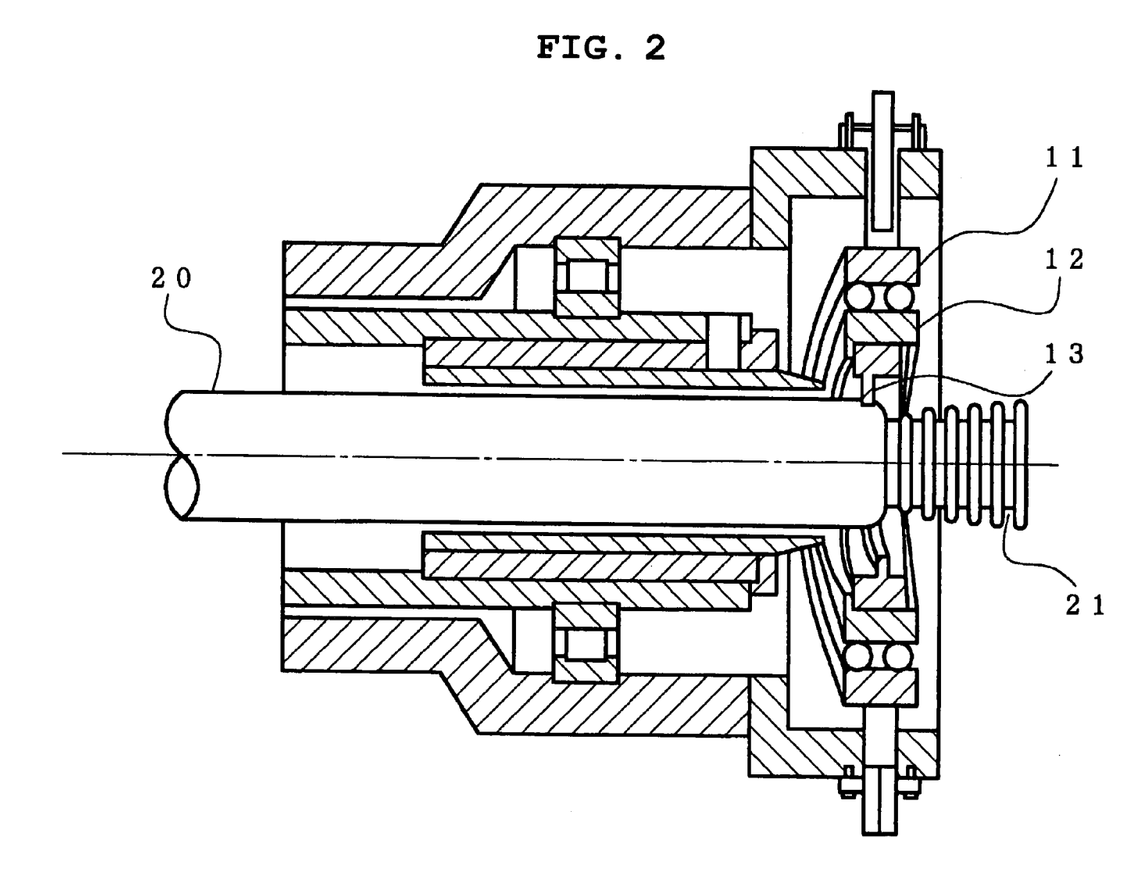
FIG. 2 is a sectional view of an example apparatus used to produce the metal bellows tube of the present invention.

First, using a conventional method of producing a metal bellows tube, a bellows tube wherein the sectional shapes of the ridge and valley in the bellows-shaped tube wall are U-shaped is prepared (first step). In preparing the bellows tube wherein the sectional shapes of the ridge and valley in the bellows-shaped tube wall are U-shaped, it is preferable to use the continuous die forming method, from the conventional methods of producing a metal bellows tube, because a bellows of a relatively narrow pitch (bellows of a relatively large number of ridges) can be formed even for a tube of a relatively small diameter. The continuous die forming method is a method wherein usually, as shown in FIG. 2, a metal tube 20 is passed through a corrugation forming die 12 fit to a die holder 11 via a bearing inserted therebetween, to support the center of the tube 20 and the center of the die 12 eccentrically, and a projection 13 of the die 12 is intruded into the metal tube 20, while rotating the corrugation forming die 12 around the center of the tube 20, to continuously form a circumferential groove 21. Thereby, a metal bellows fundamental tube 20A shown in FIG. 3, wherein the sectional shapes of the ridge and valley in the bellows-shaped tube wall are U-shaped, is formed.

Figure 3:
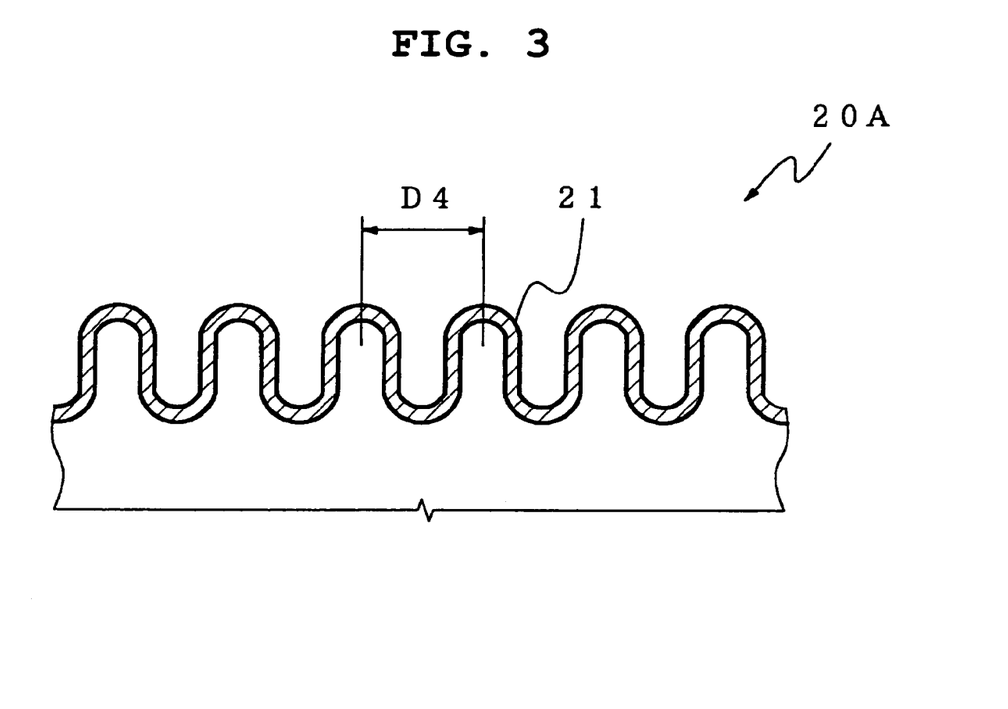
FIG. 3 is a cross-sectional view showing a portion of a metal bellows fundamental tube prepared in a first step in the production method of the present invention for a metal bellows tube.

Referring to the metal bellows fundamental tube 20A prepared in the first step, it is preferable that the pitch of the bellows D4 in the bellows-shaped tube wall 21 be 1.5-3.5 mm. This is because workability improves in the work to closely contact mutually adjacent ridges and valleys in the next second step, and also because it becomes easier to obtain a tube of a stable shape (a uniform shape in the longitudinal direction of the tube).

The metal bellows fundamental tube 20A prepared in the above-described first step is, for example, compressed in the longitudinal direction of the tube, using an external compressor, to closely contact the mutually adjacent ridges 22 and valleys 23 of the bellows-shaped tube wall 21 (FIG. 4) (second step).

Note that it is preferable that the metal bellows fundamental tube 20A be annealed before moving to the second step. By the annealing, processability in the compression processing of the tube conducted in the second step and the third step described below and in the elongating processing of the tube conducted in the fourth step described below is improved, and the fatigue deterioration of the tube due to processing can be suppressed. The annealing is preferably bright annealing, not to allow the formation of an oxidized scale on the surface of stainless steel when the tube material (plain material) is stainless steel. Note that annealing conditions are not subject to limitation, and conventionally known annealing conditions for a metal tube may be applied according to the plain material of the metal tube to be annealed; however, in bright annealing when the tube material (plain material) is stainless steel (austenitic steel), annealing is preferably conducted at 1010-1100° C.

Figure 4:
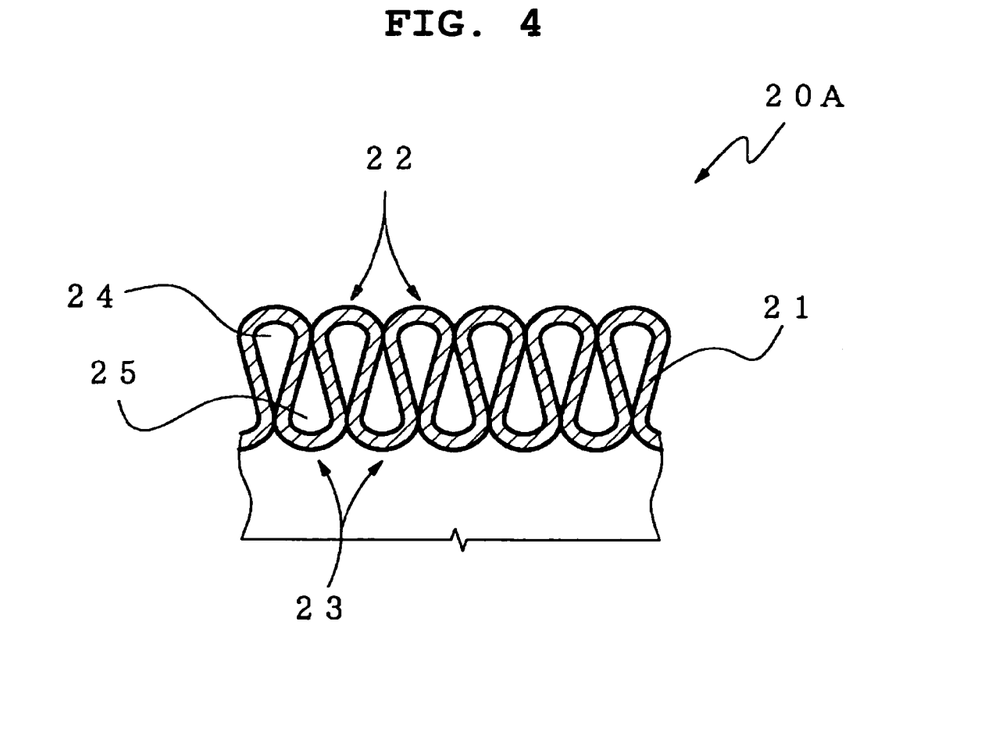
FIG. 4 is a cross-sectional view showing a portion of a metal bellows fundamental tube processed in a second step in the production method of the present invention for a metal bellows tube.
Figure 5:
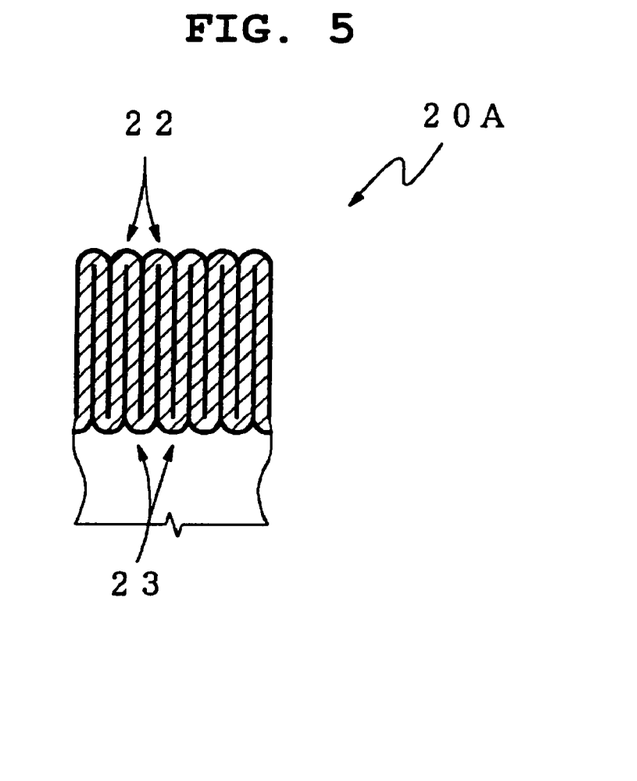
FIG. 5 is a cross-sectional view showing a portion of a metal bellows fundamental tube processed in a third step in the production method of the present invention for a metal bellows tube.

Next, a shaft is inserted inside the above-described metal bellows fundamental tube 20A with mutually adjacent ridges 22 and valleys 23 of the bellows-shaped tube wall 21 closely contacted, and said metal bellows fundamental tube 20A is pressurized in the longitudinal direction using, for example, an oil hydraulic press machine, to achieve compressive forming until the inside space 24 of each ridge 22 and the gap 25 between adjacent ridges 22 shown in FIG. 4 disappear substantially (FIG. 5) (third step). Note that "the inside space of each ridge and the gap between adjacent ridges disappear substantially" as used herein means a condition wherein the adjacent walls forming a ridge and a valley have been compressed to the extent of face contact of the adjacent walls forming the ridge and the valley, preferably of face contact of the entire faces thereof.

Figure 6:
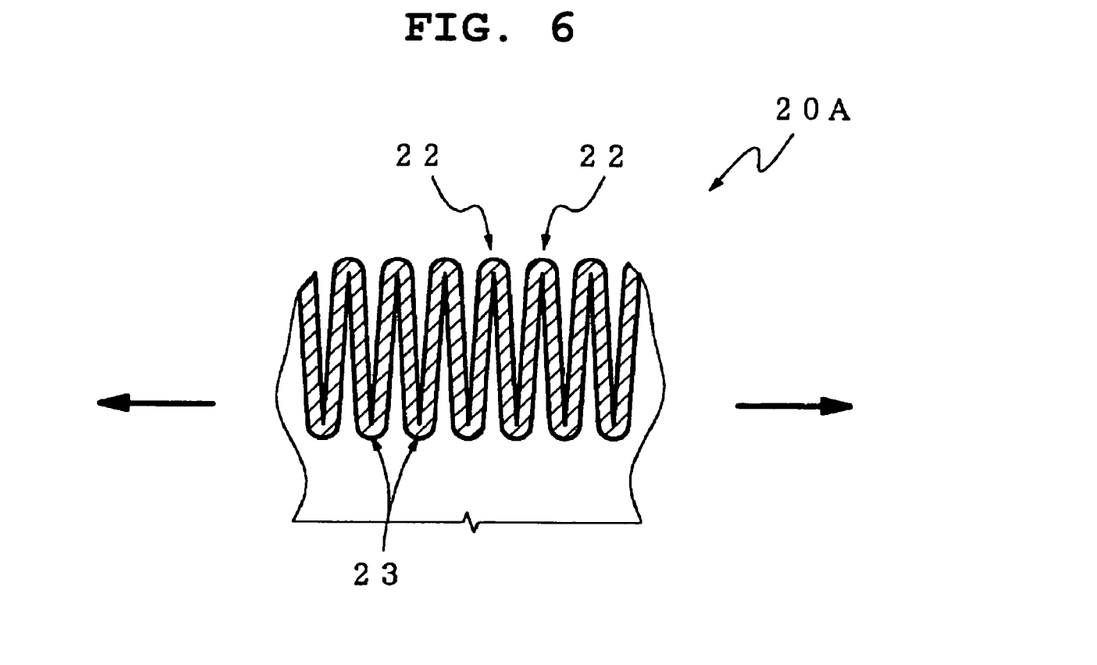
FIG. 6 is a cross-sectional view showing a portion of a metal bellows fundamental tube being processed in a fourth step in the production method of the present invention for a metal bellows tube.

Next, both ends of the metal bellows fundamental tube 20A after the above-described pressure forming are chucked and, as shown in FIG. 6, the fundamental tube is elongated in the longitudinal direction until the peak-to-peak gap of the adjacent ridges 22 becomes a predetermined gap (the aforementioned pitch D1), to complete the metal bellows tube 10 shown in FIG. 1 (fourth step).

Above described are the metal bellows tube according to the present invention and a method of producing the same. Next, the flexible tube of the present invention for a high-pressure fluid using this metal bellows tube is described.

Figure 8:
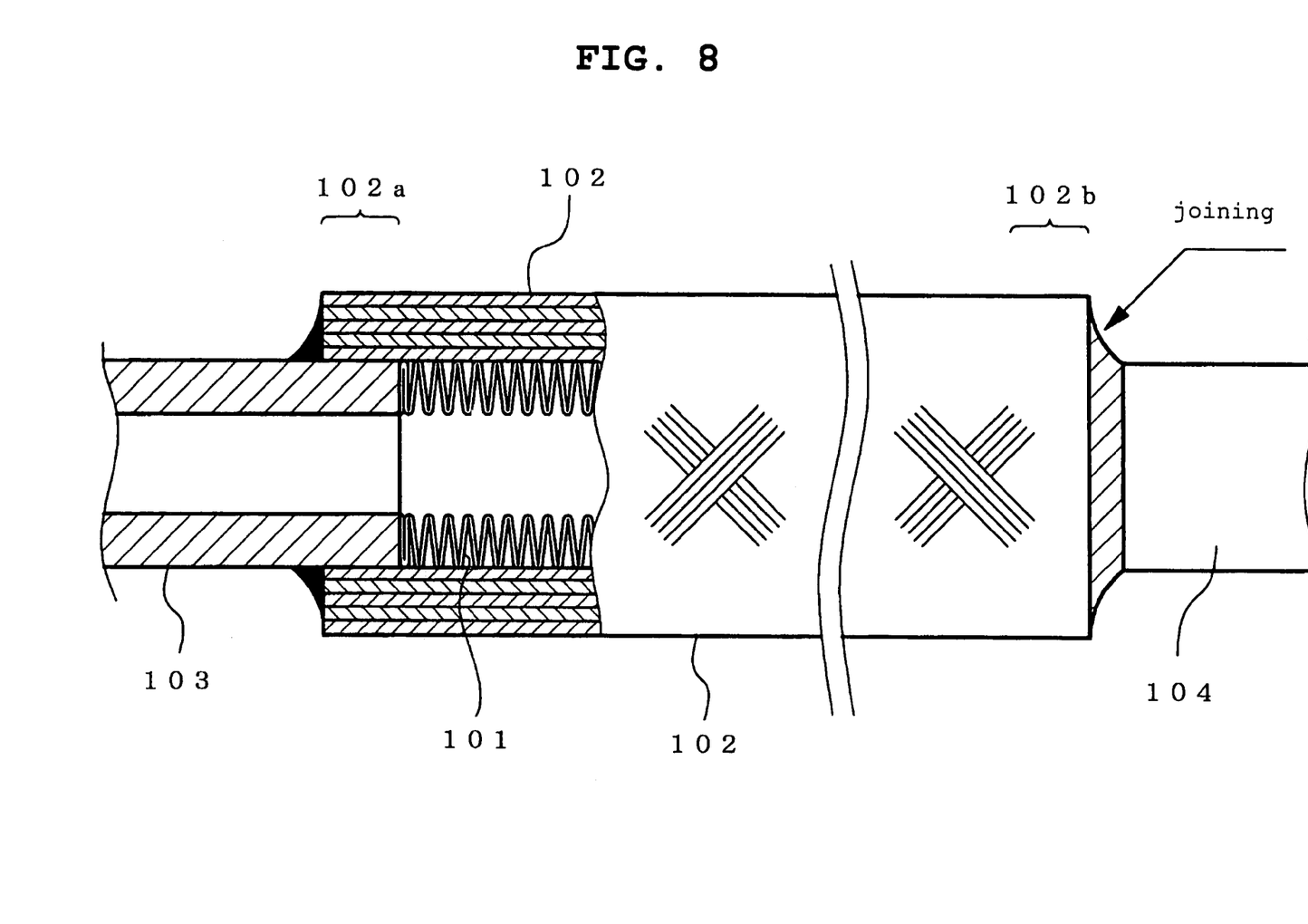
FIG. 8 is a partial sectional view showing an example of the structure of the flexible tube of the present invention for a high-pressure fluid. For the metal bellows tube, only the end face appearing on the section is shown. The braid structure of the metal braid is not depicted in detail but is shown schematically.

FIG. 8 is a partial sectional view showing an example of the structure of the flexible tube of the present invention for a high-pressure fluid (hereinafter also called "the tube").

As shown in the figure, the tube is configured with a metal bellows tube 101 according to the present invention and a tubular metal braid 102 that covers the outside of said tube. The metal bellows tube 101 has a metal material and wall thickness selected to endure the high pressure of the fluid filled therein, and is configured to possess flexibility for a tube by the tubular metal bellows portion.

The tubular metal braid 102 covers the outer portion of the metal bellows tube 101, and both ends 102a and 102b of said braid 102 are joined with respectively corresponding both ends of the metal bellows tube. In the example of FIG. 8, metal pipes, as mouth pieces 103 and 104, are joined with both ends of the metal bellows tube 101, and the ends 102a and 102b of the metal braid are joined with said mouth pieces 103 and 104, respectively, by welding or brazing. By this configuration, while avoiding spoiling the flexibility of the metal bellows tube, the elongation of the metal bellows tube 101 is regulated.

An important feature of the tube resides in that it has been formed so that the sectional shapes of the ridge and valley in the bellows-shaped tube wall of the metal bellows tube 101 are V-shaped, and that the total sectional area S and metal strand material of the metal braid have been selected so that the metal braid 102 endures a high pressure as high as 70 MPa, in the tube, which pressure is not found conventionally.

By having the above-described configuration, the fatigue of the metal bellows portion is lessened and the metal braid appropriately suppresses the elongation of the metal bellows portion; therefore, not only a conventional high-pressure fluid, but also even a high-pressure fluid of 70 MPa, can be safely transferred through the tube.

Although the fluid to be transferred using the tube is not subject to limitation, the utility of the present invention is more conspicuous in use for supplying high-pressure hydrogen gas to the hydrogen fuel cell because the hydrogen gas used for the hydrogen fuel cell is of a high pressure not found conventionally (for example, 25 MPa, 35 MPa, 70 MPa), as described in Prior Art, and also because the use of a flexible tube that does not allow the leakage of hydrogen is necessary.

The metal bellows tube used for the tube and the method of producing the same are as described above.

Because the metal bellows tube used for the tube for high pressure has achieved a small pitch D1 that has not been obtained with a conventional metal bellows tube, the bending reaction force is small, and thereby excellent flexibility is obtained, as described above, and, in addition, advantages such as improved anti-fatigue life compared to conventional metal bellows tubes with rough pitches, increased acceptable pressure against breakage in the direction of the tube diameter (because the sectional area of the tube wall portion when the tube wall portion is cut on a plane including the longitudinal axis of the tube increases due to the high-density pitch), and decreased pressure loss of the fluid passing through the metal bellows tube (because the undulation of the tube inside wall becomes finer due to the high-density pitch, so that vortexes are unlikely to form) are newly obtained.

Note that in the bellows tube wherein the sectional shapes of the ridge and valley in the bellows-shaped tube wall, manufactured by a conventional method of production, the pitch of the bellows is greater than the pitch of the metal bellows tube used in the present invention.

Regarding the material that constitutes the metal bellows tube used for the flexible tube for high pressure, considering strength against internal superhigh pressure and corrosion resistance, the stainless steels described below can be mentioned as preferable materials.

Next, the metal braid used for the flexible tube for high pressure is described.

Figure 9:
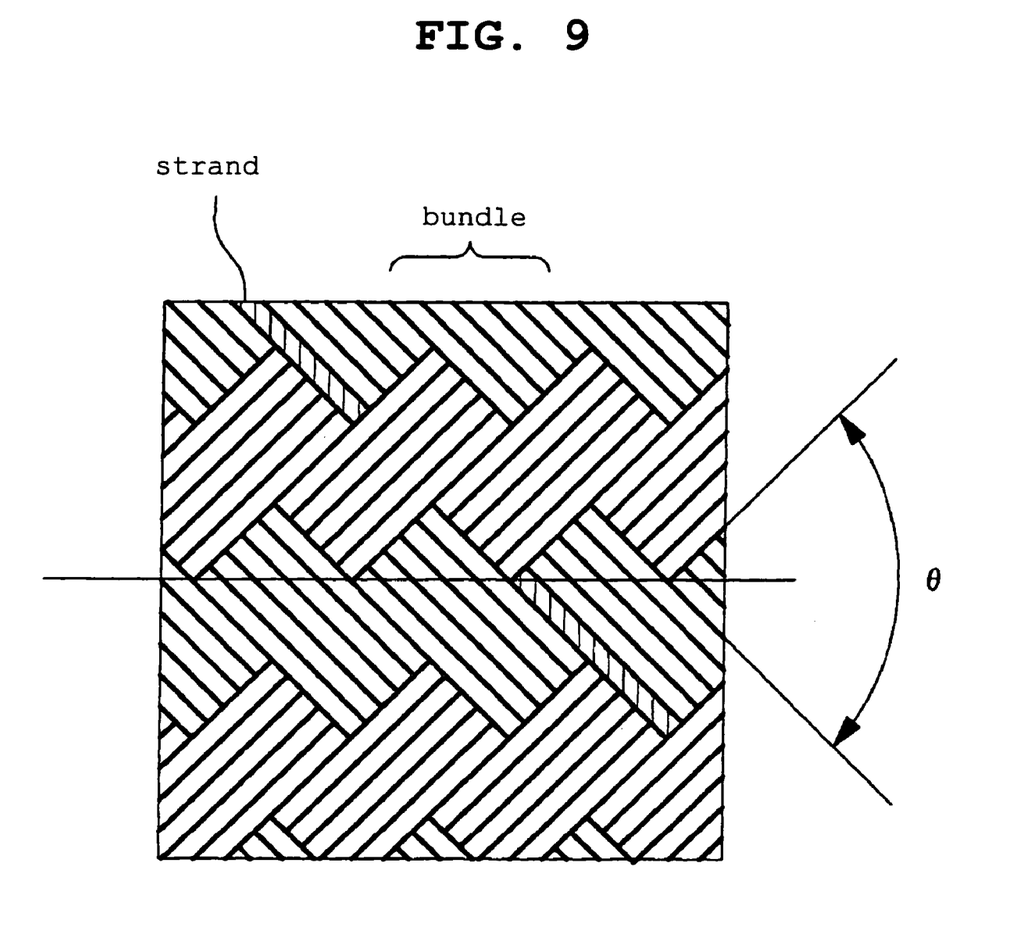
FIG. 9 is a schematic diagram for explaining the braid configuration of a metal braid. The appearance of the braid exhibits a pattern wherein bundles of strands of a strand number (in the Figure, the strand number is 5) are alternatively braided. The centerline indicates the longitudinal direction of the tube. One of the strands is shown with hatching.

The metal braid is a tubular braid also called braid, and the braid configuration thereof, as shown in FIG. 9, is such that bundles of a plurality of metal strands arranged in parallel are braided in a tubular form at a crossing angle θ and bundle number that do not produce a gap, according to the outside diameter of the metal bellows tube, to form a basic unit layer. This structure is superposed in a required layer number to assure tensile strength.

Although it is preferable that in the same layer, the strand diameter be constant, the strand diameter may differ among different layers.

The number of strands in each bundle is called "strand number", and the number of bundles used for braiding is called "bundle number". Hence, the total number of metal strands surrounding the metal bellows tube is strand number× bundle number×layer number.

Regarding braiding patterns and braiding technology, conventionally known technologies may be referred to.

The metal braid is formed with the total sectional area S and metal strand material of the metal braid selected to satisfy the formula: $(\sigma \times \cos(\theta/2))/n \geq F/S$. $\sigma$ is the tensile strength [MPa] of the metal strand material. In the present invention, a material with sufficient strength and corrosion resistance is used as the metal strand since a fluid of a high pressure as high as 70 MPa is handled. As such a metal strand material, stainless steel is preferred.

In the present invention, as preferable examples of the stainless steel used for the metal bellows tube and the metal braid, stainless steels specified in JIS G4305 (for example, SUS304, SUS329J1 and the like) can be mentioned, and those resulting from further improvement of the JIS-specified stainless steels may be used. As such improved stainless steels, austenite-ferrite biphasic stainless steel (C; 0.012 wt %, Si; 0.74 wt %, Mn; 0.70 wt %, Ni; 6.30 wt %, Cr; 25.00 wt %, Mo; 3.30 wt %, N; 0.10 wt %) can be mentioned, which can, for example, be obtained as a corrosion resisting steel manufactured by Nippon Yakin Kogyo Co., Ltd. (product number NAS64).

The tensile strength of stainless steels, including improved products such as NAS64, is normally 480-853 [MPa]. For example, the tensile strength of SUS304 is 520 [MPa], and the tensile strength of SUS329J1 is 590 [MPa]. The tensile strength of NAS64 as a cold rolled plate is 853 [MPa]. For the tensile strength of materials other than JIS-specified ones, values obtained by testing based on the test method specified in JIS Z2241 shall be used.

The metal strand used may be one produced for a conventionally known metal braid, and those specified in JIS G4309 can be mentioned. Although the diameter of said metal strand is not subject to limitation, it is preferably 0.3 mm to 0.6 mm, particularly preferably 0.3 mm to 0.5 mm.

The total sectional area S [mm$^2$] of the metal strand section appearing on a cross-section of the metal braid (a section resulting from a cut perpendicular to the longitudinal direction of the tube) is obtained as sectional area per metal strand× total number of metal strands (strand number×bundle number×layer number).

The crossing angle is 50 degrees to 120 degrees, preferably 60 degrees to 100 degrees.

The layer number of the metal braid, considering the 70 MPa inside pressure, is preferably 4 layers to 5 layers; in particular, the layer number is preferably 5 layers, in view of the currently available strand diameter and material strength, whereby it is possible to reconcile the flexibility and strength of the tube.

There has been no conventional flexible tube provided with 5 layers of a metal braid around a metal bellows tube. This may be said to be a layer number that has become feasible due to the excellent flexibility of the metal bellows tube used in the present invention.

The force F [N] exerted by a high-pressure fluid to elongate a metal bellows tube is obtained as the product of the inside pressure (up to 70 MPa) of the high-pressure fluid and the effective diameter of the metal bellows tube.

For example, provided that the effective diameter of the metal bellows tube is 5 mm to 18 mm, and assuming 70 MPa hydrogen gas is filled, the force F would be 1374 [N] to 17813 [N].

Although the safety factor may be of any value, as long as it has been determined with full consideration of safety concerning the handling of superhigh-pressure hydrogen gas, it is appropriate that the factor be 2-4 from the viewpoint of avoiding excess reinforcement. Also, if a law specifying the safety of tubes, such as the High-pressure Gas Safety Law, is available, a value that satisfies the safety factor derived in designing from the then-effective law (for example, a safety factor of 4 and the like, provided that a test with an inside pressure 4 times the desired inside pressure is specified) is adopted; if the safety factor is changed upon a legal amendment, the design value may be finely adjusted in accordance therewith.

An example of the specifications for the tube which can be utilized for transferring 70 MPa hydrogen gas is given below.

Metallic bellows tube: material NAS64, inside diameter 9.5 mm, outside diameter 16.5 mm, wall thickness of bellows-shaped tube wall 0.2 mm to 0.4 mm, number of ridges of bellows per 100 mm of tube length 83, height of ridge 3.2 mm.

Metallic braid: strand material SUS304, strand diameter 0.3 mm to 0.5 mm, strand number 6-8, bundle number 24-32, crossing angle about 90 degrees, layer number 5 (or strand number 6, bundle number 24, crossing angle about 90 degrees, layer number 3 in the case of strand material NAS64).

Overall outside diameter of tube 23 mm.

Although there is no limitation on the structure for joining both ends of the metal braid to respective both ends of the metal bellows tube, a structure wherein, as shown in FIG. 8, a metal pipe, as a mouth piece 103 or 104, is joined with both ends of the metal bellows tube by welding or brazing, and the end 102*a* or 102*b* of the metal braid 102 is extended to a position for covering said mouth piece and joined by welding or brazing, is preferable. That is, this is a structure wherein the metal braid and the metal bellows tube are joined via the mouth pieces.

For the technology for welding or brazing the braid to the metal, known technologies may be referred to.

As a preferable material for the metal pipe used for the mouth piece, stainless steel can be mentioned; it is preferable that the outside diameter and the inside diameter, in view of joining with the metal bellows tube, be roughly equalized to the overall outside diameter and inside diameter of the bellows of said bellows tube.

This mouth piece may be equipped with, at the outermost end thereof, a structure J (FIG. 10) for connection with the outside tube route, such as a screw or a tube coupler structure.

Figure 10:
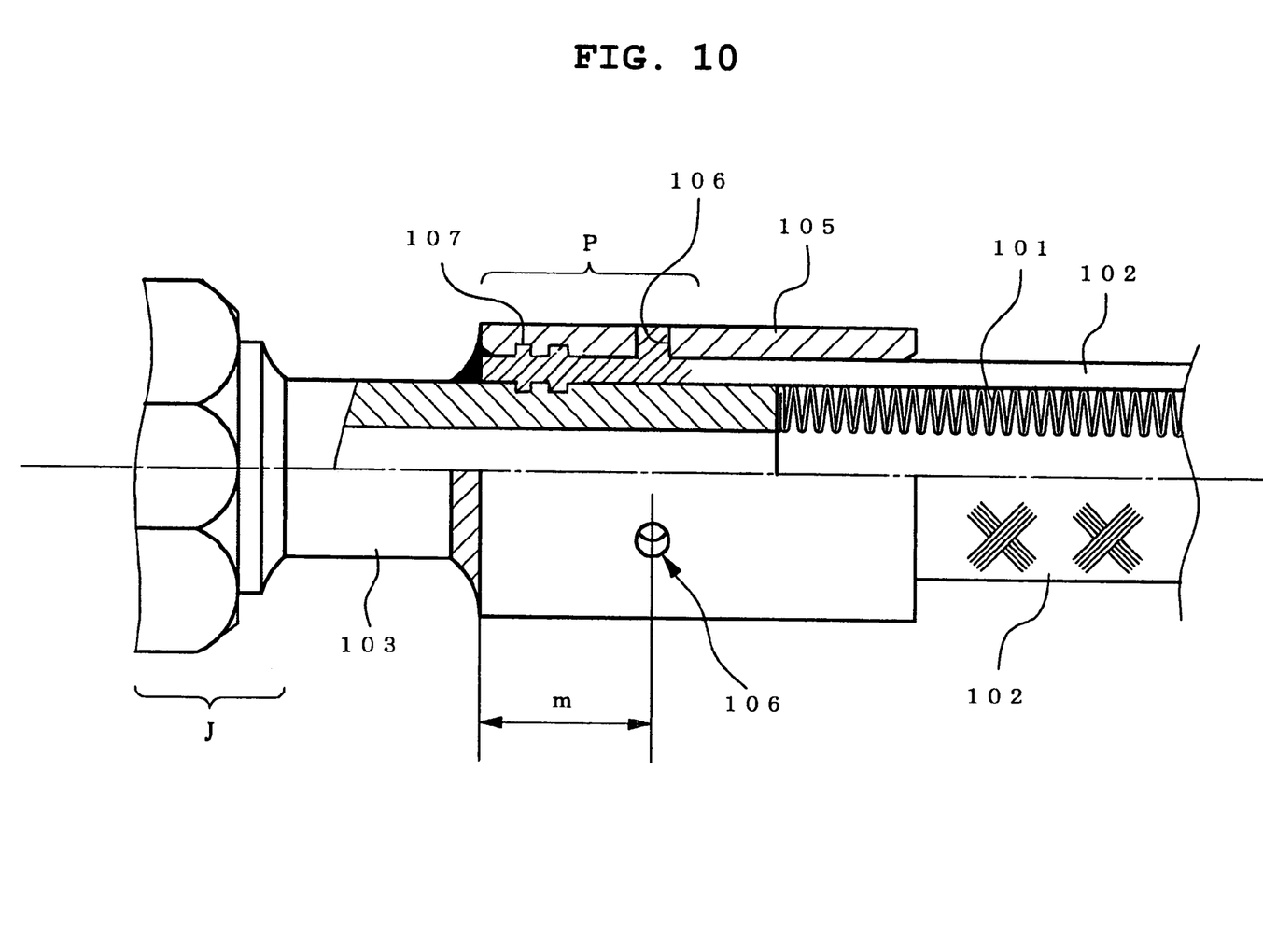
FIG. 10 is a partial sectional view showing an example of the structure of the flexible tube of the present invention for a high-pressure fluid, and also showing an example structure equipped with a braid presser ring.

As shown in FIG. 10, a structure is preferred wherein at the joining portion of the mouth piece 103 and the metal braid 102, a braid presser ring 105 that further covers them is placed, and the metal braid 102 and the braid presser ring 105 are joined with the mouth piece by brazing or welding with the end faces roughly fit each other. By providing the braid presser ring 105, the joining portion is protected and the appearance of the braid end can be beautifully finished.

When the braid presser ring 105 is used and the method of joining is brazing, to which extent the solder (for example, silver solder) has penetrated in the braid is made obscure by the presence of the braid presser ring.

Thus, in the present invention, as shown in FIG. 10, it is proposed that the braid presser ring 105 be provided with a through hole 106 to expose the metal braid at the predetermined position m from the end face. "The predetermined position" is the minimum solder material penetration distance necessary for joining. By providing said through hole, it is possible to confirm by visual inspection and the like that the solder has penetrated in the braid at least to the predetermined position, and it can easily be confirmed that the metal braid has been joined, with sufficient strength, to the metal bellows tube.

In FIG. 10, the solder has penetrated to the P range shown by hatching, and the solder having penetrated in the braid can be confirmed via the through hole 106.

Although the positions, shapes, sizes and numbers of through holes provided in the braid presser ring are not subject to limitation, and the positions are not subject to limitation, to assure a sufficient brazing penetration distance (=strength) and to clearly confirm the same, it is preferable that the predetermined position from the end face be 5 mm or more, particularly 7 mm or more. Although the upper limit of the position from the end face is not subject to limitation, as the practical range for avoiding excess penetration, 15 mm or less, particularly 13 mm or less, is preferred. As a recommended value for practical use, 10 mm can be mentioned.

Although the opening diameter of the through hole is not subject to limitation, it is preferable that the opening diameter be 7 mm to 13 mm or so, considering the ease of confirmation, ring strength reductions and the like. Said through hole may be provided in a plurality of units in the circumferential direction of the body of the braid presser ring, considering the strength.

When joining is conducted by brazing, it is preferable that, as shown in FIG. 10, a recess 107 that allows the solder to flow therein and serve as a stopper be provided in the inside of the braid presser ring and/or in the outside of the mouth piece. The recess may be a circular groove around the inner periphery of the braid presser ring or the outer periphery of the mouth piece, and may be a simple hole. Also, although the recess may be provided in any of the inside of the braid presser ring and the outside of the mouth piece, an embodiment wherein the recess is provided only in the outside of the mouth piece is preferred, considering the influence on the braid at the time of assembly (in FIG. 10, a recess is provided on both sides for the sake of explanation).

The number of the recesses and the opening dimensions, shape and depth of each recess may be appropriately determined according to the strength obtained as the solder fills in the recess.

The tube may be utilized not only for an application for connecting a fixed tank and a hydrogen fuel cell vehicle, but also for piping around the tank and piping in the vehicle. Also, the tube can be used not only for high-pressure hydrogen of 70 MPa, but also for the movable piping of industrial equipment and apparatuses and the like that handle a high-pressure fluid of lower pressure.

EXAMPLES

The present invention is hereinafter described in more concretely by means of the following examples, to which, however, the present invention is not limited.

Example 1

A stainless steel cylindrical tube was formed into a bellows fundamental tube (pitch of the bellows: 2.5 mm) wherein the sectional shapes of the ridge and valley in the bellows-shaped tube wall were U-shaped, by the continuous die forming method. Next, through the aforementioned second to fourth step, a bellows tube (flexible tube) wherein the sectional shapes of the ridge and valley in the bellows-shaped tube wall were V-shaped was prepared.

The outside diameter is 9.3 mm, the inside diameter is 5.2 mm, the thickness of the bellows-shaped tube wall is 0.15 mm, the pitch of the bellows is 0.5 mm (number of ridges per 1 cm in the longitudinal direction of the tube: 20), and the full length of the tube is 30 cm.

Comparative Example 1

A stainless steel cylindrical tube was formed by the continuous die forming method to yield a bellows tube (flexible tube) wherein the sectional shapes of the ridge and valley in the bellows-shaped tube wall were U-shaped.

The outside diameter is 9.3 mm, the inside diameter is 5.2 mm, the thickness of the bellows-shaped tube wall is 0.15 mm, the pitch of the bellows is 2.5 mm (number of ridges per 1 cm in the longitudinal direction of the tube: 4), and the full length of the tube is 30 cm.

Figure 7:
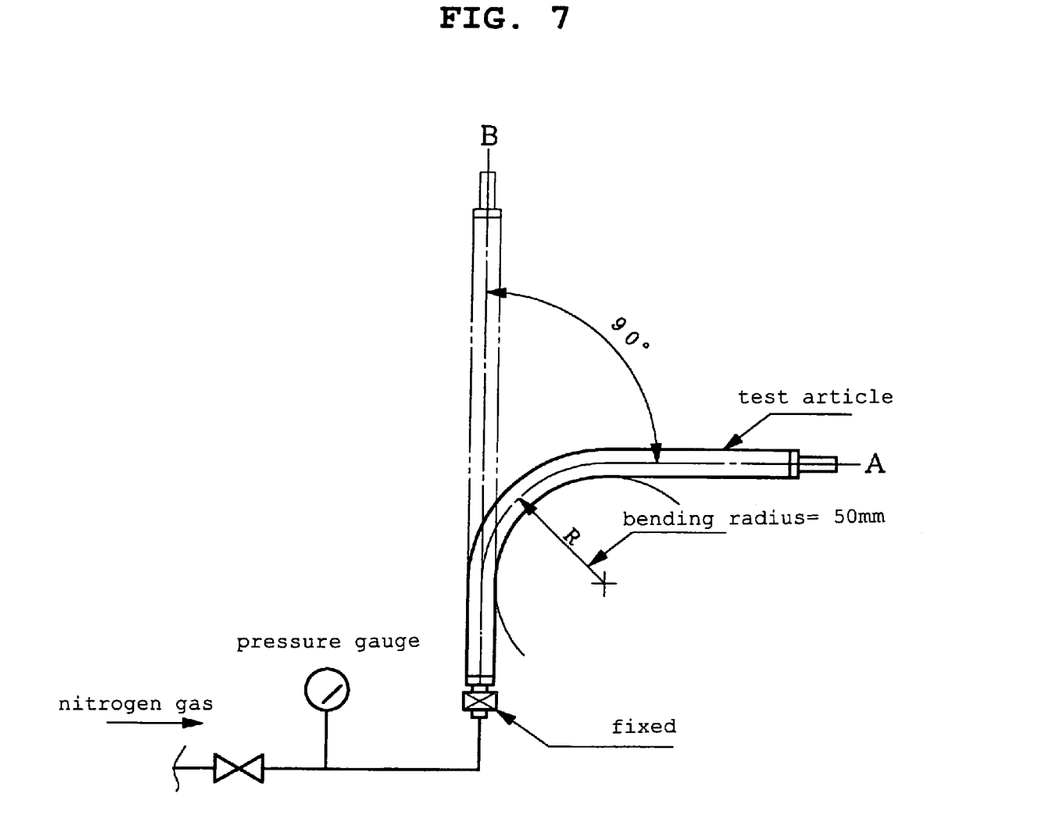
FIG. 7 is an explanatory diagram of a bending fatigue resistance test of a metal bellows tube.

For the bellows tubes of Example 1 and Comparative Example 1 prepared as described above, a bending fatigue resistance test was performed. The test was conducted, as shown in FIG. 7, by repeating 90° pulsation under an inside pressure of 5 kgf/cm$^2$G exerted with nitrogen gas, and measuring the number of repeats until the occurrence of gas leakage. Note that the number of repeats was counted with condition A→condition B→condition A as one cycle.

As a result, the number of repeats for the bellows tube of Example 1 was 13000, whereas the number of repeats for the bellows tube of Comparative Example 1 was 2200; the bending fatigue resistance of the bellows tube of Example 1 was about 6 times better than that of the bellows tube of Comparative Example 1.

INDUSTRIAL APPLICABILITY

As is evident from the above description, according to the present invention, a metal bellows tube with significantly improved bending fatigue resistance compared to conventional ones can be obtained, and in particular, a flexible tube with excellent durability can be realized.

Also, according to the flexible tube of the present invention, a high-pressure fluid of 25 MPa or higher, particularly even high-pressure hydrogen of as high as 70 MPa for the hydrogen fuel cell, can be supplied and transferred through the tube safely and without leakage.

This application is based on patent application Nos. 262072/2002 and 113508/2003 filed in Japan, the contents of which are hereby incorporated by reference.

The invention claimed is:

1. A flexible tube for use in transferring a high-pressure fluid of 70 MPa, said flexible tube comprising:
    a metal bellows tube including a first end, a second end and a bellows-shaped tube wall, said bellows-shaped tube wall including bellows having a ridge and a valley formed therein, said ridge and said valley having a V-shaped sectional shape, said bellows-shaped tube wall being formed from stainless steel and having a thickness of 0.1-0.5 mm, said ridge having a height of 1-4 mm, and said bellows having a pitch of 2 mm or less; and
    a tubular metal braid having a first end and a second end and covering an outside of said flexible tube, said first and second ends of said tubular metal braid joining with said first and second ends of said metal bellows tube, respectively, and said tubular metal braid being a densely braided layer superposed in 4 to 5 layers on an outside of said metal bellows tube, said densely braided layer comprising strands made of stainless steel and having a strand diameter of 0.3-0.6 mm and a crossing angle of 50-120 degrees, so that said tubular metal braid suppresses elongation of said bellows caused by the high-pressure fluid in said metal bellows tube.

2. The flexible tube of claim 1, wherein the high-pressure fluid is a hydrogen gas or a mixture of a hydrogen gas and liquid hydrogen.

3. The flexible tube of claim 1, wherein each of said first and second ends of said metal bellows tube has a metal pipe as a mouth piece, and each of the mouth pieces is joined with said first and second ends of said metal braid, respectively, by welding or brazing.

4. The flexible tube of claim 1, further comprising a mouth piece joined with at least one of said first and second ends of said metal braid by brazing, the at least one of said first and second ends of said metal braid being furnished with a braid presser ring covering said metal braid, said metal braid and said braid presser ring being brazed to said mouth piece with an end face of said metal braid and an end face of said braid presser ring being approximately at an even position, said braid presser ring having a through hole that exposes said metal braid at a predetermined position from the end face of said braid presser ring, and said through hole being configured to enable confirmation of penetration of a solder in said metal braid at least to the predetermined position.

5. The flexible tube of claim 1, further comprising a mouth piece joined with at least one of said first and second ends of said metal braid by brazing, the at least one of said first and second ends of said metal braid being furnished with a braid presser ring covering said metal braid, said metal braid and said braid presser ring being brazed to said mouth piece, with an end face of said metal braid and an end face of said braid presser ring being approximately at an even position, and an inside of said braid presser ring and/or an outside of said mouth piece comprising a circular recess or single recess that allows a solder to flow therein and serves as a stopper.

6. The flexible tube of claim 1, wherein said metal bellows tube has an inside diameter of 4-17 mm.

7. The flexible tube of claim 1, wherein said metal bellows tube is formed by a production method comprising:
   preparing a metal bellows fundamental tube having an initial bellows shaped tube wall, such that the initial bellows shaped tube wall has sectional portions of initial ridges and valleys that are U-shaped;
   compressing the fundamental tube in a longitudinal direction to bring the initial ridges and valleys that are adjacent into close contact with each other;
   pressure-forming the fundamental tube until an inside space of each initial ridge and a gap between initial ridges that are adjacent substantially disappear, and
   stretching, in the longitudinal direction, the initial fundamental tube after said pressure forming until a predetermined distance is achieved between peak-to-peak gaps of the initial ridges that are adjacent.

8. A flexible tube for use in transferring a high-pressure fluid of 70 MPa, said flexible tube comprising;
   a metal bellows tube having a bellows-shaped tube wall, a first end and a second end, said bellows-shaped tube wall including bellows having a ridge and a valley formed therein, said ridge and said valley having a V-shaped sectional shape;
   a tubular metal braid having a metal strand, a first end and a second end and covering an outside of said flexible tube, said first and second ends of said tubular metal braid joining with said first and second ends of said metal bellows tube, respectively; and
   a mouth piece joined with at least one of said first and second ends of said metal braid by brazing, the at least one of said first and second ends of said metal braid being furnished with a braid presser ring covering said metal braid, said metal braid and said braid presser ring being brazed to said mouth piece with an end face of said metal braid and an end face of said braid presser ring being approximately at an even position, said braid presser ring having a through hole that exposes said metal braid at a predetermined position from the end face of said braid presser ring, and said through hole being configured to enable confirmation of penetration of a solder in said metal braid at least to the predetermined position,
   wherein a total sectional area S of said metal braid member and material of said metal strand are determined so as to satisfy $(\sigma \times \cos(\theta/2))/n \geq F/S$ wherein F [N] is a force of the high-pressure fluid which acts to stretch said metal bellows tube, S [mm$^2$] is the total sectional area of said metal strand appearing on a cross-section of said metal braid, a crossing angle $\theta$ of the metal braid=50-120 degrees, $\sigma$ [MPa] is a tensile strength of the material of said metal strand, and n is a safety factor.

9. A flexible tube for use in transferring a high-pressure fluid of 70 MPa, said flexible tube comprising;
   a metal bellows tube having a bellows-shaped tube wall, a first end and a second end, said bellows-shaped tube wall including bellows having a ridge and a valley formed therein, said ridge and said valley having a V-shaped sectional shape;
   a tubular metal braid having a metal strand, a first end and a second end and covering an outside of said flexible tube, said first and second ends of said tubular metal braid joining with said first and second ends of said metal bellows tube, respectively; and
   a mouth piece joined with at least one of said first and second ends of said metal braid by brazing, the at least one of said first and second ends of said metal braid being furnished with a braid presser ring covering said metal braid, said metal braid and said braid presser ring being brazed to said mouth piece, with an end face of said metal braid and an end face of said braid presser ring being approximately at an even position, and an inside of said braid presser rings and/or an outside of said mouth piece comprising a circular recess or single recess that allows a solder to flow therein and serves as a stopper,
   wherein a total sectional area S of said metal braid member and material of said metal strand are determined so as to satisfy $(\sigma \times \cos(\theta/2))/n \geq F/S$ wherein F [N] is a force of the high-pressure fluid which acts to stretch said metal bellows tube, S [mm$^2$] is the total sectional area of said metal strand appearing on a cross-section of said metal braid, a crossing angle $\theta$ of the metal braid=50-120 degrees, $\sigma$ [MPa] is a tensile strength of the material of said metal strand, and n is a safety factor.

* * * * *